July 8, 1958
H. A. McMASTER
2,841,925
APPARATUS FOR GLASS TEMPERING
Filed Feb. 8, 1954
6 Sheets-Sheet 1
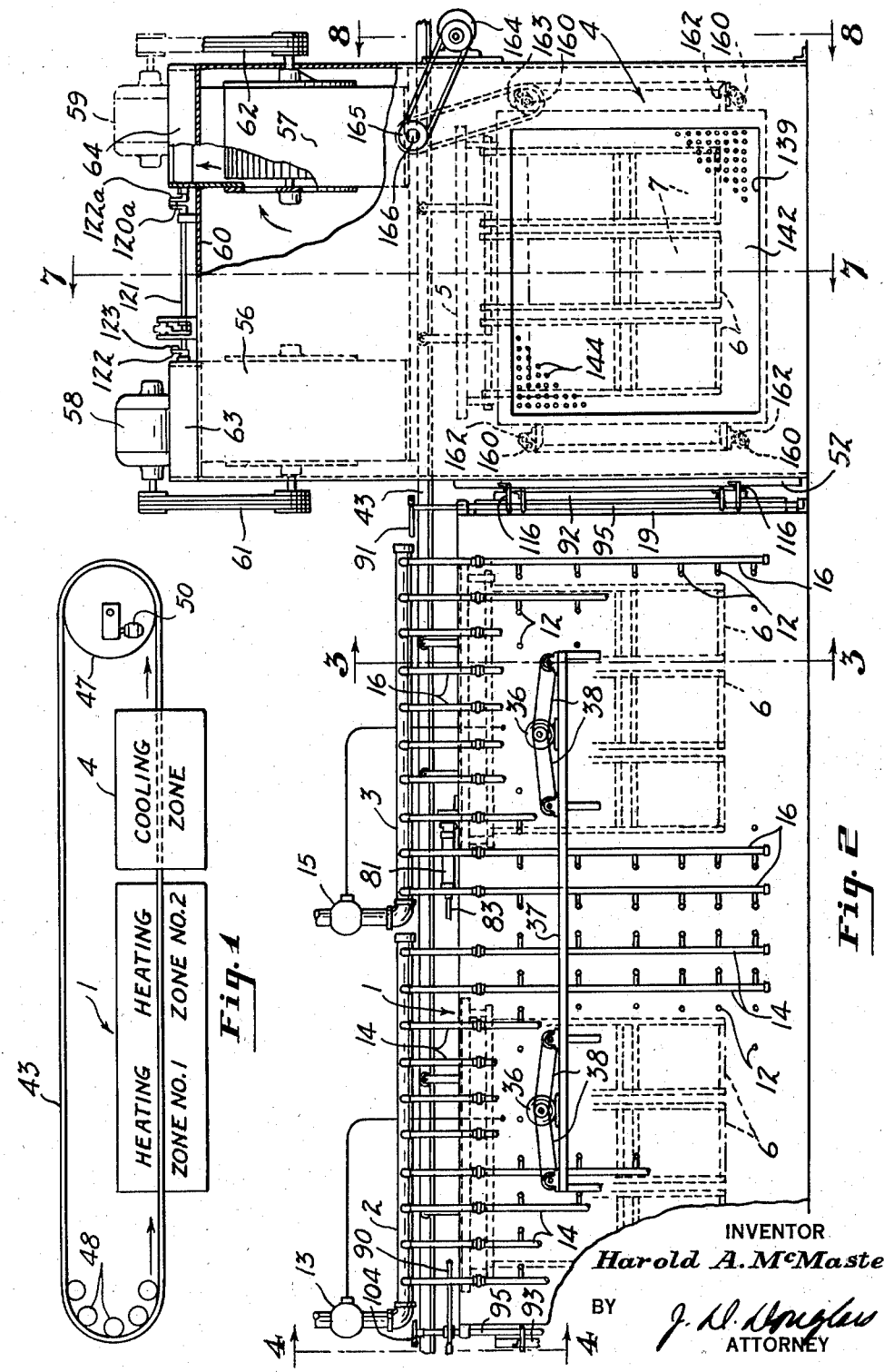
INVENTOR
Harold A. McMaster
BY
ATTORNEY

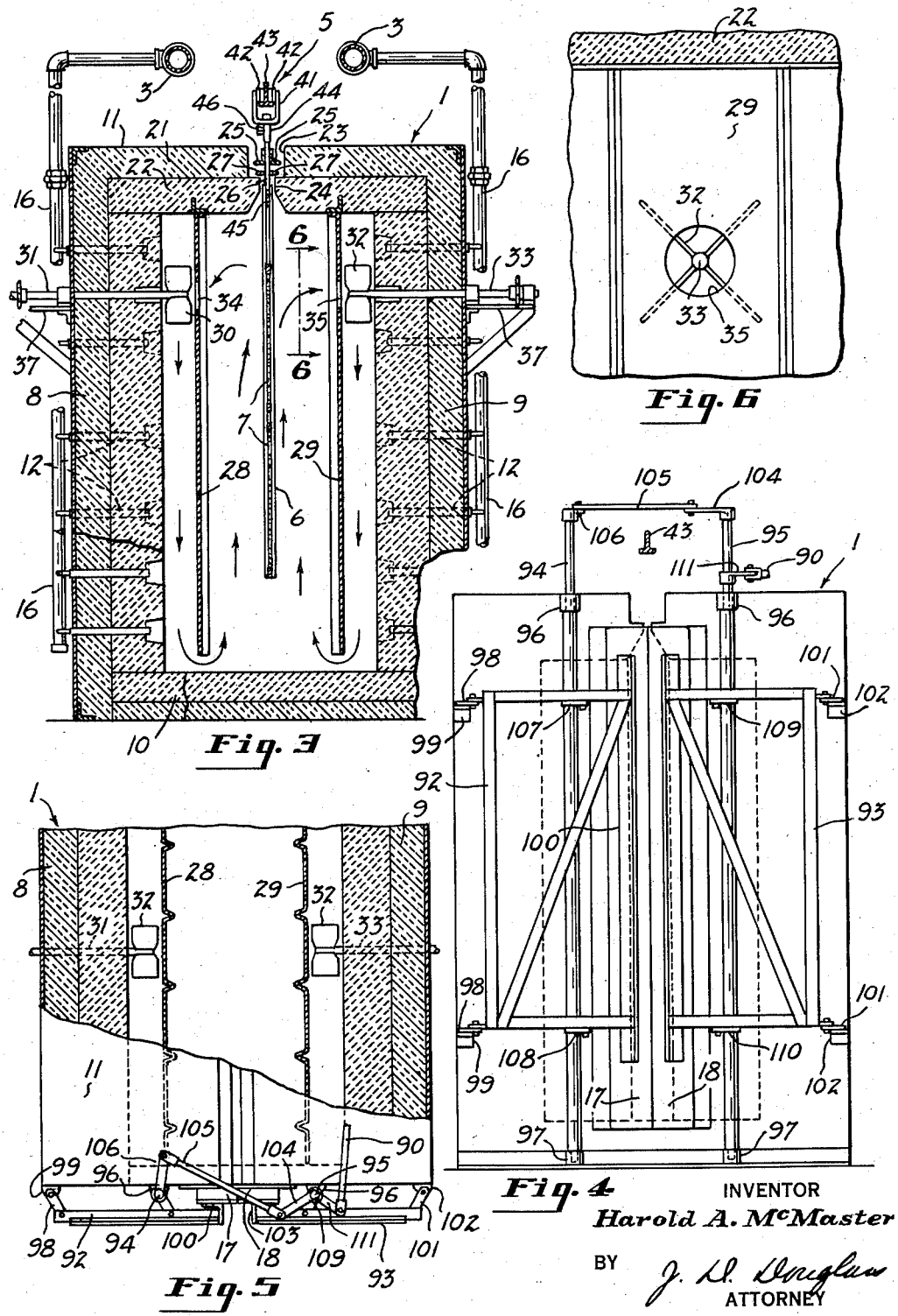

July 8, 1958 — H. A. McMASTER — 2,841,925
APPARATUS FOR GLASS TEMPERING
Filed Feb. 8, 1954 — 6 Sheets-Sheet 3

INVENTOR
Harold A. McMaster
BY J. D. Douglass
ATTORNEY

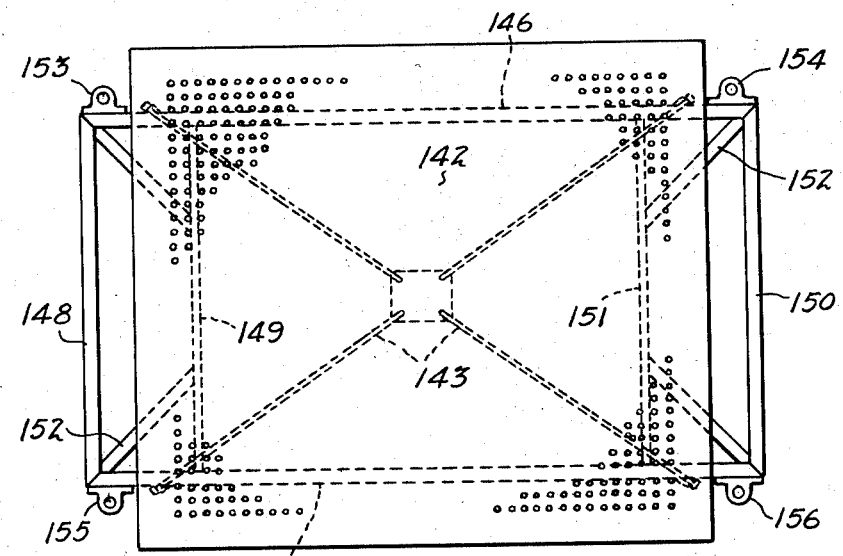
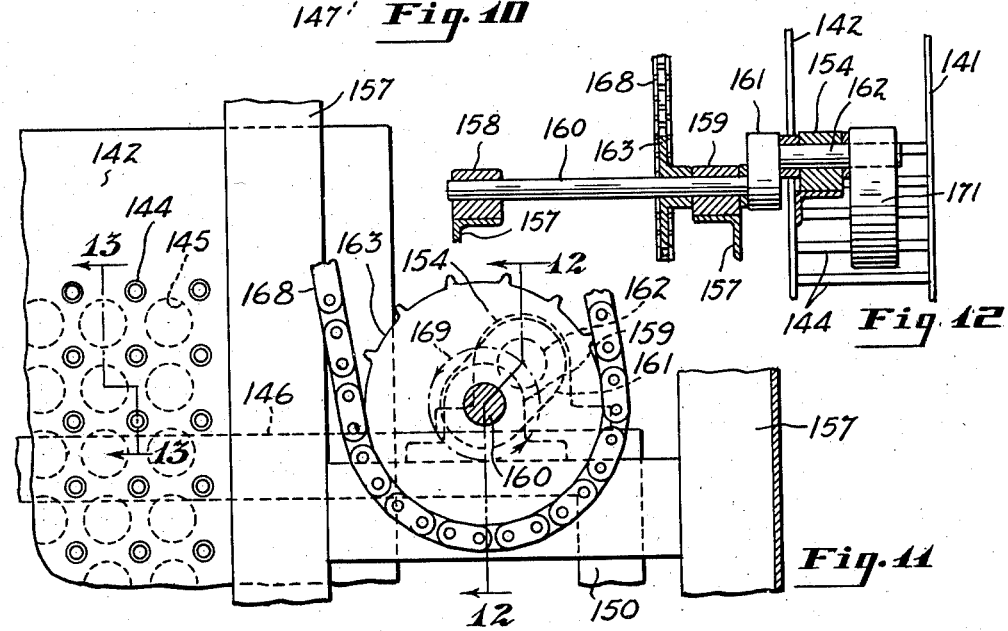
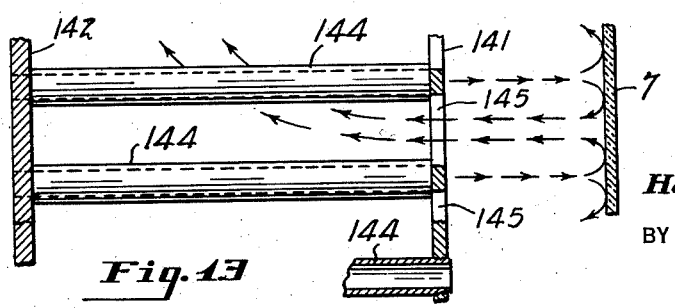

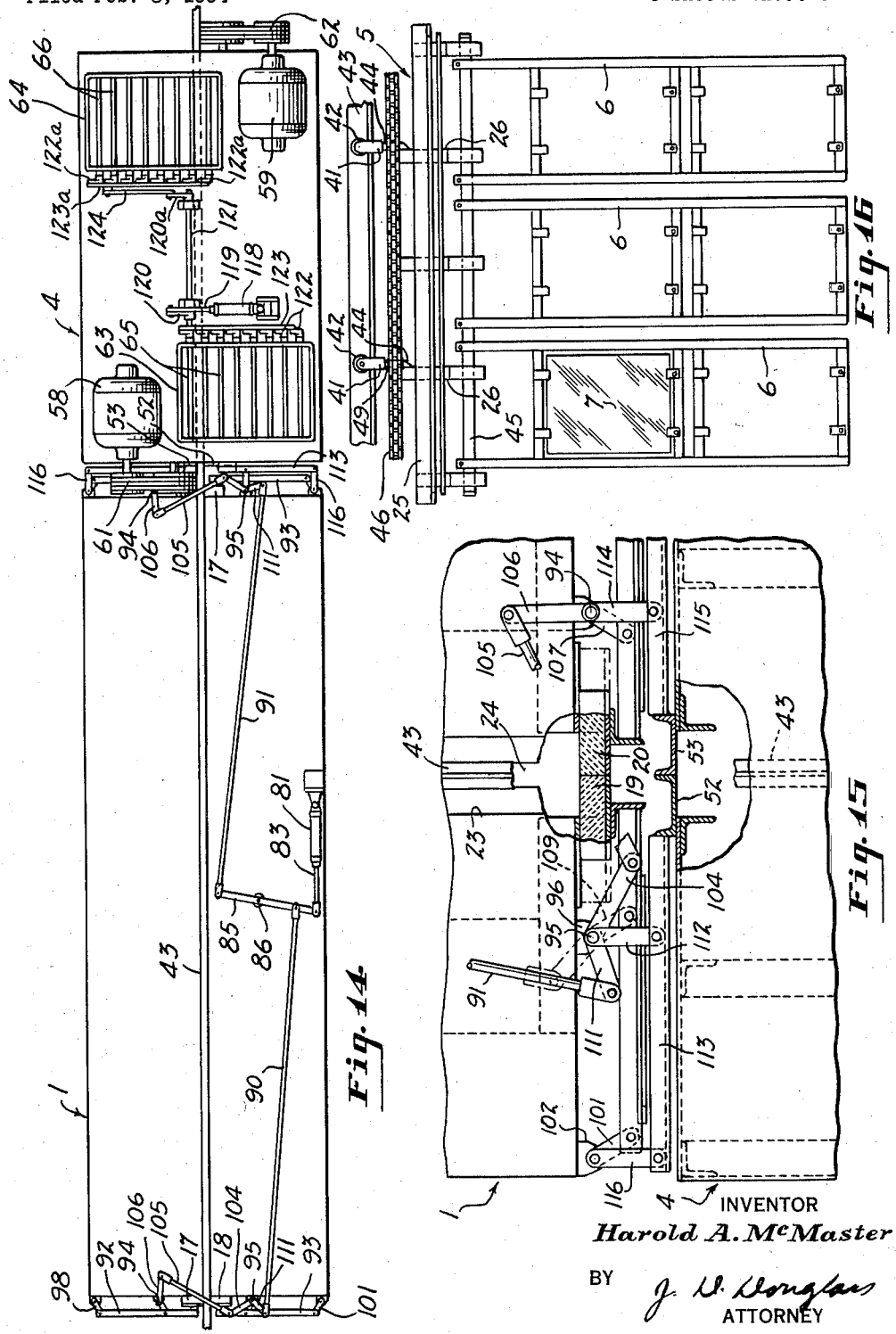

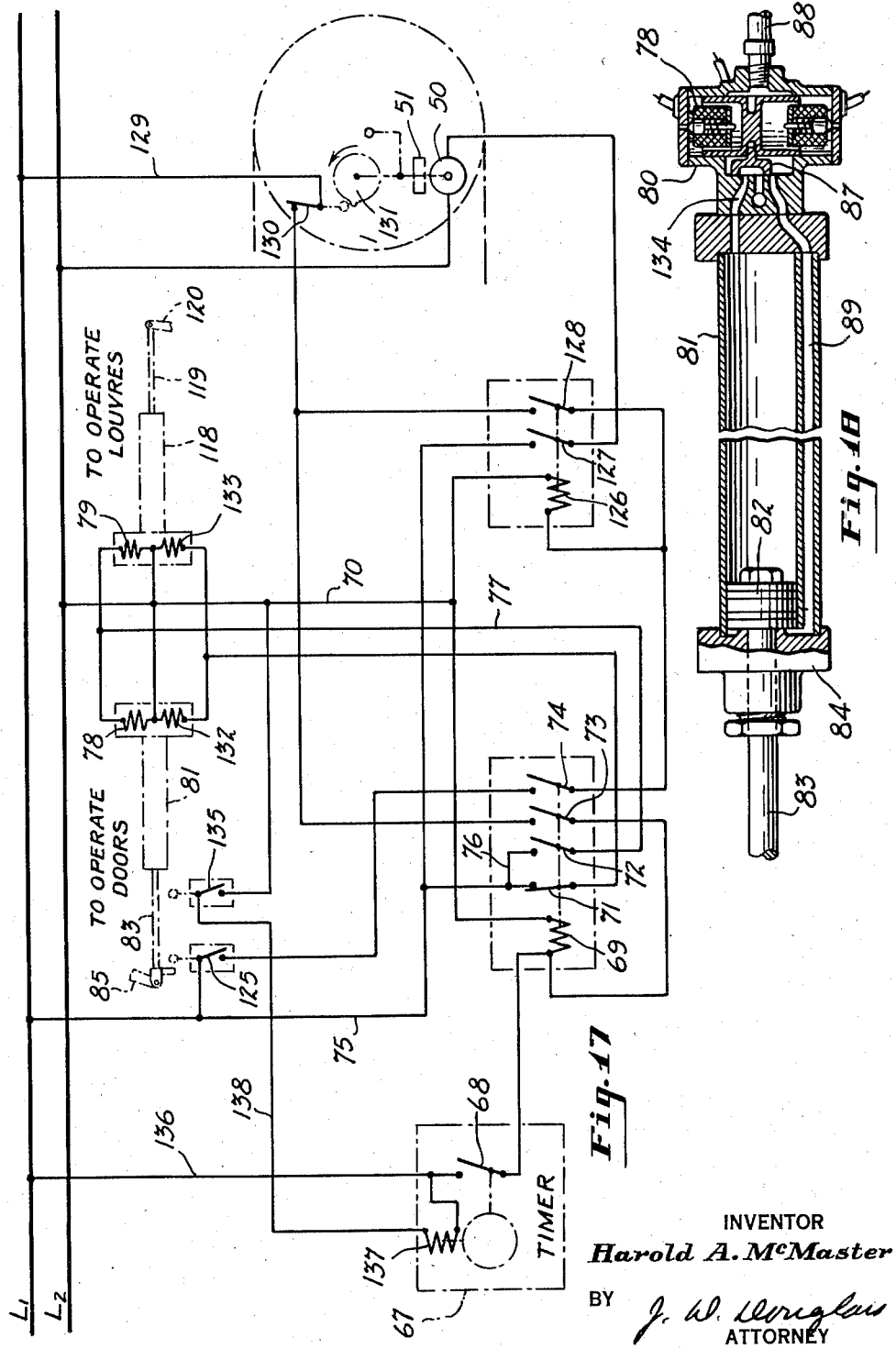

United States Patent Office 2,841,925
Patented July 8, 1958

---

2,841,925

APPARATUS FOR GLASS TEMPERING

Harold A. McMaster, Genoa, Ohio, assignor to Permaglass Inc., Genoa, Ohio

Application February 8, 1954, Serial No. 408,934

7 Claims. (Cl. 49—47)

This invention relates to apparatus for tempering glass and more particularly to an apparatus by means of which both sides of a glass plate or sheet may be uniformly heated to substantially the softening point of the glass and then suddenly cooled in a predetermined period of time.

In tempering glass, it is the practice to heat the glass to substantially its softening point and to then suddenly cool the glass to improve its strength and to provide a product that will shatter into small granular particles when broken. Because of stresses developed in the glass during the tempering process, it is necessary to carefully control the heating and cooling of the glass to prevent breakage of the glass and to provide a product having the desired properties.

According to the present invention, an improved apparatus is provided by means of which glass in the form of a plate or sheet may be uniformly heated to the desired temperature in a furnace and then quickly cooled in a predetermined period of time. The improved apparatus of the present invention is also so designed that plates or sheets of glass may be continually passed through the furnace and blast head.

It is therefore an object of the present invention to provide an improved apparatus for tempering glass in which the opposite sides of the glass are uniformly heated under controlled conditions in a furnace in a predetermined period of time and the glass is then suddenly cooled.

Another object of the invention is to provide apparatus for passing glass in the form of plates or sheets through a furnace having controlled means for uniformly heating both sides of the glass in a predetermined period of time and from which the glass is then quickly passed into a blast head in which means are provided for suddenly and uniformly cooling the glass in a predetermined period of time to temper the same.

A further object of the invention is to provide improved apparatus in which frames carrying glass plates or sheets may be continually passed through a furnace provided with means for uniformly heating the opposite sides of the plates or sheets to substantially the softening point of the glass and by means of which the glass plates or sheets may then be quickly passed into a blast head without drawing heated air from the furnace and in which jets of air may be impinged at a comparatively high speed against the opposite sides of the glass plates and in which the movement of the air is then quickly reversed and removed from the blast head to provide sudden cooling of the glass plates or sheets.

Another object of the invention is to provide improved apparatus for suddenly cooling glass in the form of plates or sheets which have been heated to substantially their softening point by means of which air is forced at a comparatively high speed against the opposite sides of the glass to suddenly cool the glass and in which the flow of air heated by the plates when it is impinged thereon is quickly reversed and withdrawn from contact with the glass plates.

A still further object of the invention is to provide improved apparatus including a furnace and blast head, each having front and rear doors and in which a partial vacuum is maintained in the blast head when the doors of the blast head are closed, which partial vacuum is automatically destroyed when the doors of the furnace and blast head are opened to permit frames carrying glass plates to be passed into the blast head without drawing heated air from the furnace or cold air into the blast head.

Other objects and advantages of the invention will be apparent as the specification proceeds.

The invention will be better understood by reference to the accompanying drawings in which:

Fig. 1 is a diagrammatic plan view of a heating furnace and blast head or cooling chamber showing means for passing frames carrying plates or sheets of glass through the furnace and blast head;

Fig. 2 is a side elevational view of the furnace and blast head, a portion of the side wall of the blast head being broken away to show adjacent structure and part of the furnace being also shown broken away;

Fig. 3 is a cross sectional view taken on a plane passing through the line 3—3 of Fig. 2, looking in the direction of the arrows;

Fig. 4 is a front elevational view of the furnace as seen from a plane passing through the line 4—4 of Fig. 2;

Fig. 5 is a plan view of the front portion of the furnace with parts broken away to show underlying structure;

Fig. 6 is a detail view taken on a plane passing through the line 6—6 of Fig. 3, looking in the direction of the arrow;

Fig. 10 is a side elevation view of one of the cooling frames;

Fig. 11 is an enlarged detail view of a portion of one of the cooling frames, showing means for imparting a circulatory motion to the frame while glass plates are arranged between the cooling frames;

Fig. 12 is a reduced cross sectional view taken on a plane passing through the line 12—12 of Fig. 11, looking in the direction of the arrows;

Fig. 13 is an enlarged detail view taken on a plane passing through the line 13—13 of Fig. 11, looking in the direction of the arrows;

Fig. 14 is a top plan view of the furnace and blast head, showing means for opening and closing the doors of the furnace and the front doors of the blast head and means for opening and closing the shutters or louvers in the outlet end of the blower casings;

Fig. 15 is a detail plan view with parts in section of the rear doors of the furnace and the front doors of the blast head, showing means for simultaneously opening the doors;

Fig. 16 is a side elevational view of a rack provided with frames for carrying the glass plates or sheets;

Fig. 17 is a wiring diagram showing the manner in which the parts are operated; and Fig. 18 is an enlarged cross sectional view of a cylinder provided with valves for controlling the opening and closing movement of the doors of the furnace and the front doors of the blast head and for controlling the opening and closing of the shutters or louvers in the outlet casings of the blowers.

Figures 7, 8, 9:
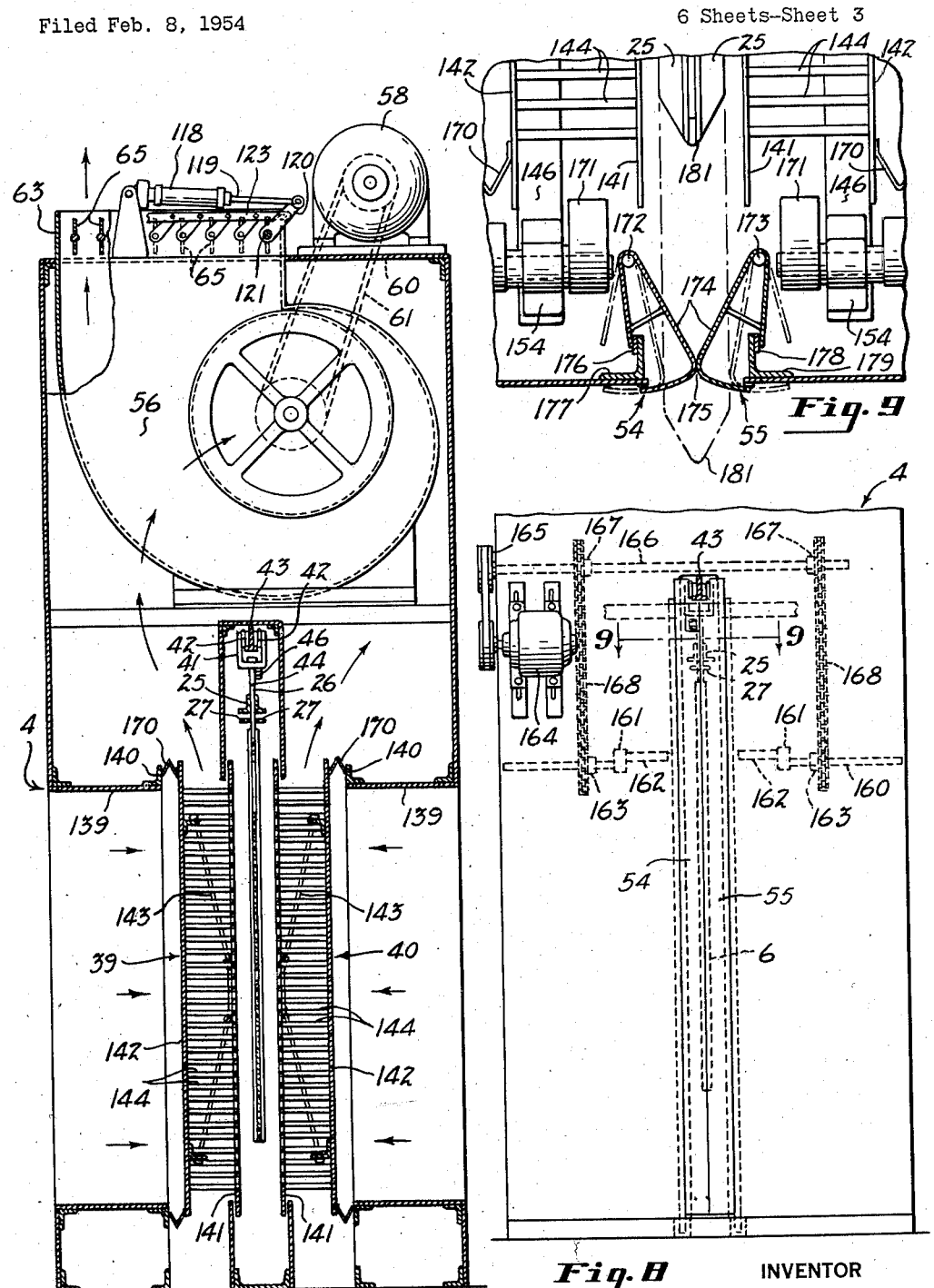
Fig. 7 is a view taken on a plane passing through the line 7—7 of Fig. 2, looking in the direction of the arrows and showing a sectional view of the cooling frames and a side elevational view of one of the blowers with parts broken away to show adjacent structure.
Fig. 8 is an end elevational view of the rear end of the blast head as seen from a plane passing through the line 8—8 of Fig. 2, the upper part of the blast head being broken away.
Fig. 9 is an enlarged view taken on a plane passing through the line 9—9 of Fig. 8 looking in the direction of the arrows with parts shown in plan and parts in section.

As illustrated in Figs. 1 and 2 of the drawings, the apparatus comprises a furnace 1 provided with headers 2 and 3 for supplying gas to the opposite sides of the furnace, a blast head or cooling chamber 4, and a plurality of movable carriers or racks 5 for frames 6 in which plates or sheets of glass 7 are supported.

According to the present invention, the furnace is constructed in such manner that the opposite sides of the glass plates may be uniformly heated to the desired temperature while the glass plates or sheets are suspended in the furnace and although the invention is not limited thereto, two heating zones are preferably provided, the plates or sheets being heated to a predetermined temperature in the first heating zone and to a somewhat higher temperature in the second heating zone. There is no dividing wall, however, between the zones so that the heating of the glass will be substantially gradual from the temperature maintained in the first heating zone of the furnace to the somewhat higher temperature maintained in the second heating zone.

The furnace, as illustrated more particularly in Figs. 2 to 6 and 15, comprises side walls 8 and 9, a bottom wall 10, and a top wall 11, each of which is formed of inner and outer layers of thermal insulating material. The inner layer which is subjected to the heat of the furnace also has refractory properties.

While the furnace may be heated in any desirable manner, as illustrated burners 12 extend through each side wall of the furnace and to provide a uniform distribution of heat in the furnace, the burners are spaced in closer relation to each other at the bottom portion of the furnace than at the upper portion thereof. As illustrated in Fig. 1 of the drawings, the gas for heating the first zone of the furnace is supplied from the header 2 which is provided with a regulating valve 13 and a plurality of branch pipes 14 which are connected to the burners extening into the first heating zone of the furnace and gas for heating the second zone is supplied from the header 3 which is provided with a regulating valve 15 and branch pipes 16 which are connected to burners 12 in the second heating zone. Valve 13 is regulated in a well known manner by a thermostat arranged in the first heating zone of the furnace and valve 15 is regulated by a thermostat arranged in the second zone of the furnace, or if desired, valve 13 may be set to provide approximately the desired temperature in the first heating zone and valve 15 may be regulated by a thermostat in the second heating zone, the temperature of which must be maintained within a critical range.

During the heating of the glass, the furnace is substantially sealed against the admission of air and for this purpose, the furnace is provided with front doors 17 and 18 and rear doors 19 and 20 as shown in Figs. 4 and 15. To provide a space in which the supporting means for the frame carrying the glass plates or sheets may be moved, the layers 21 and 22 forming the upper wall of the furnace are provided with slots 23 and 24, the upper slot 23 being provided to receive angle irons 25 arranged on opposite sides of metal strips 26, which metal strips extend downwardly from the carrier or rack 5 into the furnace for supporting frames 6 and arranged upon opposite sides of strips 26 are plates 27 for sealing the slot 24 and lower refractory layer 22 of the top wall of the furnace.

To enable the opposite sides of the glass plates or sheets to be uniformly heated while they are in the furnace, means are provided to circulate the air in both zones of the furnace. For this purpose, a pair of corrugated baffles 28 and 29 formed of heat resistant metal are provided, the upper end of each of which is secured by suitable means, such as welding, to an angle iron arranged in the lower layer 22 of the top wall of the furnace. Baffle 28 is arranged between the burners 12 in side walls 8 and glass plates 7, and baffle 29 is arranged between burners 12 in side wall 9 and the opposite side of glass plates 7. The lower ends of the baffles are spaced from the bottom wall of the furnace and means are provided to circulate air within the furnace so that the opposite sides of the glass plates will be uniformly heated in each zone of the furnace. For this purpose, a pair of fans 30 are arranged between baffle 28 and side wall 8 in the upper portion of each zone of the furnace and each fan is provided with a shaft 31 extending through wall 8 and in a like manner a pair of fans 32 are arranged between side wall 9 and baffle 29 in the upper portion of each zone of the furnace, each of which is provided with a shaft 33 extending through wall 9. Baffle 28 is provided with an opening 34 opposite each fan 30 and baffle 29 is provided with an opening 35 opposite each fan 32 and when the fans are rotated, air is drawn through openings 34 and 35 from the inner sides of baffles 28 and 29 and is forced downwardly along the outer side of the baffles where it is heated and the heated air is then forced upwardly along the outer sides of the glass plates. The fans may be rotated in any desirable manner. As illustrated in Fig. 1, a pair of motors 36 are supported at the desired height on a bracket 37 secured to each side wall of the furnace, the shaft of each of which is connected by suitable transmission means 38 to the shafts of each pair of fans.

The racks 5 for frames 6 which carry the glass plates 7, are supported and constructed in such manner that they may be moved into and through the heating zones of the furnace and between cooling frames 39 and 40 in the blast head 4. As shown more particularly in Figs. 3 and 16, each carrier or rack consists of a plurality of U-shaped members 41 arranged above each frame which are provided with rollers 42 for movement on the flanges of an inverted T-shaped track 43 which may be supported in any desired manner from the building in which the apparatus is located. Each of the U-shaped members 41 carries a bolt 44 having a flat side which is welded or otherwise secured to a strip 26 and the lower portion of each of the strips 26 which moves in the furnace is provided with side plates and a bottom plate forming an opening through which the upper bar 45 of the frame extends.

The carriers or racks 5 are moved on track 43 by suitable means, such as a chain 46 which is preferably of the roller type and which is trained to engage a sprocket wheel 47 arranged rearwardly of the blast head and small sprockets 48 arranged forwardly of the furnace as shown in Fig. 1. The chain 46 is connected to one of the bolts 44 arranged above each carrier or rack by suitable means, such as welding. The chain, in turn, is driven by suitable means, such as a motor 50, the shaft of which is secured to the shaft of sprocket wheel 47.

Motor 50 is preferably provided with a fluid clutch 51, as shown diagrammatically in Fig. 17, to assure gradual acceleration of the chain when the motor is started.

The glass in its heated condition is moved into the blast head where the opposite surfaces are cooled by jets of air that impinge upon the surface thereof. As will hereinafter more clearly appear the blast head includes pairs of frames which support a plurality of inlet tubes which open to the air in the room. The frames are so arranged that the air comes in from the outside, hits the glass and then is sucked back into the frames through openings intermediate the jets, the frames being surrounded at their peripheries by a structure which performs the function of a manifold. The air then is passed from the manifold to the exterior of the building. This has several advantages among which are the complete removal of the heated air from the surface of the glass preventing the piling up of the air and causing resultant hot spots and the discharge of the air exteriorly of the building eliminating the great amount of heat which often makes working conditions unbearable.

The blast head or cooling chamber is provided with inlet doors 52 and 53 as shown in Fig. 15 and outlet doors 54 and 55, as shown in Figs. 8 and 9, and arranged above cooling frames 39 and 40 are a pair of blowers 56 and 57 as shown in Figs. 2 and 7 which are rotated by motors 58 and 59 arranged on the top wall 60 of the blast head and which are connected by suitable transmission means to the blowers. As shown, motor 58 is connected to the shaft of blower 56 by a belt 61 and motor 59 is connected by a belt 62 to the shaft of blower 57. Casings 63 and 64 of blowers 56 and 57 extend through openings in the top wall of the blast head, casing 63 being provided with shutters or louvers 65 and casing 64 being provided with shutters or louvers 66.

The carriers or racks 5 for frames 6 are arranged at a predetermined distance from each other on the chain 46 and in accordance with the invention, means are provided to open the doors of the furnace and the front doors of the blast head and to close shutters or louvers in casings of the blowers and to then energize motor 50 for moving the first rack carrying glass plates into the first heating zone of the furnace. For this purpose, an electrical circuit is provided including a timer mechanism 67 which if desired may be mounted in any suitable manner on one side of the furnace and which is illustrated diagrammatically in Fig. 17.

As shown in Fig. 17, the timer mechanism is set so that after a predetermined period of time, it closes a switch 68 which establishes a circuit from line L1 through switch 68, relay 69, and conductor 70 to L2 and when relay 69 is energized, it opens a switch 71 and closes switches 72, 73 and 74 and when switch 72 is closed, a circuit is established from line L1 through conductors 75 and 76, switch 72 and conductor 77 to solenoids 78 and 79.

*Furnace door operating means*

In accordance with the present invention there is provided door operating means which controls the opening and closing of the front doors of the furnace. This door-operating means includes the solenoid 78, which is actuated by the timer mechanism through switch 68, as just described, to open the front doors of the furnace.

Solenoid 78 is arranged in the head 80 of a cylinder 81 as shown in Fig. 18, the front end of which is pivotally mounted on a bracket on the top wall of the furnace and in which a piston 82 reciprocates. Piston 82 is provided with a piston rod 83 which extends through an opening in the rear head 84 of the cylinder, the outer end of which is connected to one end of a lever 85 mounted on a pivot 86 extending upwardly from the top wall of the furnace as shown in Fig. 14 and when solenoid 78 is energized, it moves a valve 87 arranged in head 80 of the cylinder upwardly and a fluid, such as air, under pressure flows through conduit means 88 and 89 to the rear side of the piston 82 which moves piston 82 and rod 83 to the right rotating lever 85 in a counter-clockwise direction on its pivot.

A connecting rod 90 has one end secured to the lever 85 on one side of pivot 86 and the other end of rod 90 is connected to mechanism for opening the front doors of the furnace and a second connecting rod 91 is secured to the opposite end of lever 85, the other end of which is connected to mechanism for opening the rear doors of the furnace and the front doors of the blast head.

The door operating means for the front doors of the furnace (Figs. 4, 5 and 14) also includes frames 92 and 93 arranged on the front wall of the furnace and a pair of vertically extending rods 94 and 95, each of which is rotatable in upper and lower bearings 96 and 97 in the front of the furnace. As shown, the outer side of frame 92 is pivotally connected to arms 98 which in turn are pivotally connected to brackets 99 secured to the front wall of the furnace and the inner side of frame 92 is welded or otherwise secured to an angle iron 100 which is secured in a similar manner to door 17. In a like manner, the outer side of frame 93 is pivotally connected to arms 101 which in turn are pivotally mounted on brackets 102 secured to the front end of the furnace and the inner side of frame 93 is welded or otherwise secured to an angle iron 103 which is secured in a similar manner to door 18. To open the front doors, means are provided to rotate rods 94 and 95 in directions opposite to each other. For this purpose, the upper portion of rod 95 is provided with an arm 104 which is pivotally connected to one end of a link 105, the other end of the link being connected to an arm 106 secured to a rod 94. Rod 94 is also provided with arms 107 and 108 which are pivotally connected to the upper and lower bars of frame 92 and rod 95 is provided with arms 109 and 110 which are pivotally connected to the upper and lower bars of frame 93. An arm 111 is also secured to vertical rod 95 which is connected to the adjacent end of connecting rod 90 and when rod 90 is pulled rearwardly by lever 85, rod 94 is rotated in one direction to move door 17 to open position and rod 95 is rotated in the opposite direction to move door 18 to open position.

The rear doors of the furnace are opened in the same manner as the front doors, see Figs. 2, 14 and 15, and the parts have accordingly been designated by the same reference numerals.

To open the front doors of the blast head, one end of each of a pair of arms 112 is secured to vertical rod 95 at the rear end of the furnace and the other end of each arm is pivotally connected to a frame 113. One end of frame 113 is secured by suitable means, such as welding, to door 52, and the other end is connected to an arm 116 pivoted on bracket 102 which is secured to the rear end of the furnace adjacent to one side wall. In a like manner, one end of each of a pair of arms 114 is secured to vertical rod 94 at the rear end of the furnace, the other end of each arm being pivotally connected to a frame 115. One end of frame 115 is secured by suitable means, such as welding, to door 53 and the other end is connected to an arm pivoted to a bracket secured to the rear end of the furnace adjacent the opposite side walls which arm and bracket are similar to arm 116 and bracket 102 shown in Fig. 15. When rod 91 is moved forwardly to rotate rods 94 and 95 in opposite directions to each other, the rear doors 19 and 20 of the furnace and the front doors 52 and 53 of the blast head are opened.

Blowers 56 and 57 in the blast head are continuously operated. It is therefore desirable to close the shutters or louvers in the outer end portions of the casings of the blowers to enable the front door of the blast head to be easily opened and to prevent heated air from being drawn from the furnace into the blast head when the doors of the furnace and the front door of the blast head are open. It is also desirable to close the shutters or louvers when the rear doors of the blast head are open to prevent cold air, which may cause fluttering and breakage of the glass, from being drawn into the blast head. Solenoid 79 is therefore energized at the same time as solenoid 78 and means responsive to the energization of solenoid 79 is provided for closing the shutters or louvers in the casings of the blowers.

*Operating means for blower casing outlet in blast head*

As shown in Fig. 17, solenoid 79 is arranged in the upper portion of the head of a cylinder 118 (Fig. 7) which is similar in construction to the cylinder 81 shown in Fig. 18 of the drawings and when solenoid 79 is energized, it raises a valve 87 which permits a fluid under pressure, such as air, to flow to the rear of the piston to move piston rod 119 connected thereto inwardly into the cylinder, and means responsive to the inward movement of piston rod 119 are provided to close the shutters or louvers as illustrated more particularly in Figs. 7 and 14. As shown, piston rod 119 is pivotally connected to an arm 120, the other end of which arm is secured to shaft 121 which is rotatably mounted in bearings secured to the top of the blast head and when piston rod 119 is drawn into cylinder 118, it rotates shaft 121. One end of shaft 121 extends through an opening in casing 63 and is secured to one of the louvers therein. Each of the other louvers in casing 63 is secured to a shaft which extends through one side wall of the casing and each louver shaft is provided with an arm 122, all of which are connected to a link 123 which link in turn is connected to an arm on shaft 121. In a somewhat similar manner, shafts connected to each of the louvers 66 in casing 64 extend through one side wall of the casing 64 and each is provided with an arm 122$_a$ which is connected to a link 123$_a$. Link 123$_a$, in turn, is connected to a second link 124 which is secured to an arm 120$_a$ on the opposite end of shaft 121. The casing 63 is preferably connected by a duct (not shown) to the exterior of the building. Thus, the heated air is disposed at a place where it will not interfere with the comfort of the workers.

Frame moving means

The present invention provides means actuated by the door operating means for moving a frame carrying a glass plate into the furnace following the opening of the front doors of the furnace.

After piston rod 83 is drawn inwardly into cylinder 81 a sufficient extent to open the doors of the furnace and the front door of the blast head, it actuates a switch 125 as shown in Fig. 17 of the drawing which momentarily establishes a circuit from line L1 through switch 74 to relay 126. When relay 126 is energized, it closes switches 127 and 128 and a circuit is established from line L1 through conductor 129, switches 130 and 128 and relay 126 which maintains switch 127 in closed position and establishes a circuit from line L1 through conductor 75 and switch 127 to motor 50 which when energized moves one of the racks 5 carrying frames 6 and the glass plates 7 into the first heating zone of the furnace. A circuit is also established from line L1 through conductor 129, switches 130 and 73, relay 69 and conductor 70 for maintaining the doors of the furnace and the front door of the blast head open during movement of the rack into the furnace. The timer mechanism is so set that switch 68 opens after the doors of the furnace and the front doors of the blast head are opened.

Means for actuating the door operating means to close doors

The present invention provides means associated with and movable with the frame moving means for actuating the door operating means to close the front doors of the furnace following the movement of the frame into the furnace.

As shown in Fig. 17, a cam 131 is connected to the driving mechanism of motor 50 and when the motor is rotated a sufficient extent to move the first rack into the first heating zone of the furnace, cam 131 actuates switch 130 which interrupts the circuits to relays 126 and 69 and when relay 126 is deenergized, switch 127 opens and interrupts the circuit to motor 50 and when relay 69 is deenergized, switches 72, 73 and 74 open and switch 71 closes which establishes a circuit from line L1 through conductor 75 and switch 71 to the lower solenoids 132 and 133 in the front heads 80 of cylinders 81 and 118.

When solenoid 132 is energized, it lowers valve 87 in the cylinder head 80 of cylinder 81 and opens conduit means 134 to provide fluid pressure on the front end of piston 82 to move it to the position shown in Fig. 18, thereby rotating lever 85 in a clockwise direction to close the doors of the furnace and the front door of the blast head, and, in a like manner when solenoid 133 is energized, fluid pressure is applied to the front end of piston 82 to force piston rod 119 outwardly which opens the louvers or shutters in the casings of blowers 55 and 56.

Timer resetting means

The present invention also includes means actuated by the door operating means to reset the timer after the frame has been moved into the furnace.

When piston 83 is moved outwardly to close the doors of the furnace, it also actuates a switch 135 and a circuit is established from line L1 through conductor 136, solenoid 137, and conductor 138 to switch 135 to reset the timer to such a position that it will move switch 68 to closed position after a period of time which is determined by the length of time that the rack carrying the first set of plates is maintained in the first zone of the heating furnace.

According to the invention, a temperature ranging from approximately 1200° to 1220° Fahrenheit is maintained in the first heating zone of the furnace and time of heating will vary from approximately 85 to 120 seconds depending upon the thickness of the glass plates or sheets being tempered. The thickness of the glass may vary from approximately 3/16 to 5/16 of an inch although the invention is not to be limited in this respect to its use on glass of any particular thickness.

When switch 68 again closes, the furnace doors and the front door to the blast head are again opened and the shutters or louvers in the blowers are closed and motor 50 is energized in the manner previously described to move the first rack into the second zone of the heating furnace and a second similar rack carrying glass plates into the first heating zone of the furnace, after which a circuit is established to close the doors of the furnace, the front doors of hte blast head, and to open the louvers in the blower casings. In the second heating zone of the furnace, a somewhat higher temperature is maintained which may vary from approximately 1220° to 1260° Fahrenheit. The glass plates are heated in the second zone for the same length of time as they heated in the first zone. Because of the distribution of the burners and the arrangement of the baffles and circulating fans in the furnace, it will be apparent that both sides of each glass plate will be uniformly heated in both zones of the furnace.

When the timer mechanism again actuates switch 68, the doors of the furnace and the front door of the blast head are again opened, and the louvers in the upper portions of the casings of the blowers are closed, the first rack is moved into the blast head, the second rack is moved into the second zone of the heating furnace, and a third rack carrying glass plates is moved into the first zone of the heating furnace. The doors of the furnace and the front doors of the blast head are then closed and the louvers in the blower casings are opened in the manner previously specified and the glass plates in the second and third racks are heated while the glass plates in the first rack are being cooled.

The apparatus for cooling the glass plates or sheets in the blast head is illustrated more particularly in Figs. 7, 9, 10, 11, 12 and 13.

To enable air to be drawn through the cooling frames 39 and 40, the blast head is provided with inwardly extending rectangular-shaped casings 139, each of which is provided with an outwardly extending flange or rim 140. Cooling frames 39 and 40 are arranged in spaced relation to each other and when a rack is moved into the blast head, the glass plates are suspended between the cooling frames.

The cooling frames are so constructed that air is forced at a comparatively high speed in the form of jets against each side of each glass plate and the flow of air is then reversed and is drawn outwardly through the cooling frames. For this purpose, each of the cooling frames consists of inner and outer plates 141 and 142 which are connected togther by suitable bracing means designated generally by the numeral 143. Extending through the plates of each frame, over substantially its entire area, are a plurality of spaced tubes 144 arranged in comparatively close relation to each other, each of which is perpendicular to the glass plates when the frame carrying the glass plates is in the blast head and consequently air drawn through the tubes will be directed against each side of the glass. Arranged in the inner plate of each cooling frame and in staggered or dispersed relation to the inner ends of tubes 144 over the surface of the inner plates are spaced apertures 145 having an aggregate area which is substantially in excess of the aggregate cross sectional area of the openings in the tubes, and preferably is at least several times as great. For instance, in a cooling frame in which the inner and outer plates are 86 inches long and 74 inches wide, approximately 1287 one-half inch tubes are provided and the inner plate is provided with approximately 1216 one and one-half inch apertures.

When the blowers are rotated, a partial vacuum is maintained in the blast head, the degree of which may of course be varied and will depend largely upon the power and the speed at which the blowers are rotated. A vacuum of approximately six inches of water has been found to be satisfactory. Because of the vacuum maintained in the blast head, it will be apparent that air drawn through the tubes 144 of each cooling frame will strike the glass plates with a fairly high velocity resulting in the plates being cooled with considerable rapidity. The air striking the hot glass plates will cool the glass plates and the air will in turn be heated by the hot plates. The direction of flow of the heated air after it strikes the plates, however, is immediately reversed as shown in Fig. 13 and is drawn by the blowers 56 and 57 outwardly through the apertures in the inner plates.

To prevent air passing through tubes 144 from continuously striking the glass plates at the same spots during the cooling process and to provide a more even means of cooling distribution, means are provided for supporting and imparting an oscillating or circulatory motion to each cooling frame. For this purpose, each frame is provided with a pair of angle irons 146 and 147, each of which is welded or otherwise secured to the inner face of the outer plate of each frame and extends beyond each end thereof. The angle irons may be braced in any suitable manner. As shown vertical braces 148, 149, 150 and 151 are provided and additional braces 152 extend angularly from strips 149 and 151 to the corners formed by the angle irons and the outer vertical braces 148 and 150. The upper flange of angle iron 146 of each frame is provided with upper bearings 153 and 154 which may be welded or otherwise secured thereto and the lower flange of angle iron 147 of each frame is provided with lower bearings 155 and 156 which may be secured thereto in a like manner.

A supporting structure 157 is arranged within the blast head and means associated with the supporting structure and the frame bearings are provided for moving each cooling frame with a circulatory or oscillating motion. As illustrated, the supporting structure is provided with inner and outer spaced bearings 158 and 159 arranged in alignment with each of the bearings on the frame and in which a shaft 160 is rotatably mounted. An eccentric 161 is mounted on the inner end of each shaft 160, the outer end of which is provided with a pin 162 which extends through one of the bearings on the cooling frame. As illustrated, pin 162 extends through upper bearing 154. It will of course be understood that the same arrangement is provided for each of the other bearings 153, 155 and 156 and that both cooling frames are supported for a circulatory or oscillating movement in a similar manner.

For rotating shafts 160, one of the shafts 160 associated with the bearings of each cooling frame is provided with a sprocket wheel 163 fixed thereto which is rotated by suitable means, such as a motor 164 provided with a built in speed reducer which motor is fixed to the rear wall of the blast head. The shaft of motor 164 is connected by suitable means, such as a belt, to a pulley 165 fixed end of a shaft 166 extending through the blast head, and fixed to shaft 166 within the blast head are a pair of spaced sprocket wheels 167, one of which is connected by means of a chain 168, to a sprocket wheel 163 attached to one of the shafts 160 associated with the bearings of one of the cooling frames and the other of which is connected by similar means to a sprocket wheel 163 fixed to one of the shafts 160 which is associated with the bearings of the other cooling frame.

As shown in Fig. 11 when the shafts 160 associated with the bearings of each cooling frame are rotated, the eccentric 161 which is secured to each shaft is also rotated and the axis of the pin 162 extending from each eccentric moves in a circle as indicated by the numeral 169 and consequently each portion of the cooling frame is moved in a similar circle.

To prevent air from by-passing the tubes in the cooling frames during movement of the frames, each frame is provided with a flexible resilient seal 170 which may be of spring metal for engaging the flange or rim 140 on each casing 139. Preferably the seal is secured to the flange 140 and bears against the smooth flat outer surface of the plate 142, which may be lubricated to provide a sliding movement and to increase the effectiveness of the seal.

To provide easy movement of the cooling frames, a counterweight 171 is provided at the outer end of each pin 162 which counterweights are so arranged that they counteract the weight of the cooling frame.

The time required to cool the glass plates 7 carried by the frames 6, when it is in the blast head, is the same as the time the glass plates remain in each heating zone of the furnace, and, after the glass plates in the blast head are cooled, switch 68 as shown in Fig. 17 is again actuated by the timer mechanism to open the doors of the furnace and the front doors of the blast head and to close the louvers in the blower casings. When the switch 125 is again actuated, motor 50 is energized to move a fourth rack carrying glass plates into the first zone of the furnace, the third rack being moved to the second heating zone of the furnace, the second rack into the blast head, and the first rack in which the glass plates have been cooled in the blast head is passed through the rear doors 54 and 55 of the blast head.

As illustrated in Figs. 8 and 9, the rear doors 54 and 55 of the blast head are mounted on vertical rods 172 and 173 which are supported in upper and lower bearings in the blast head as shown in Fig. 8 and each door includes an angularly extending portion 174 which portions converge together to form a seal 175. The angularly extending portion 174 of door 54 extends around rod 172 and at its opposite end engages a vertical strip 176 on a vertically extending angle iron 177. In a like manner, the angularly extending portion of 174 of door 55 extends around rod 173 and its opposite end engages a vertically extending strip 178 on a vertically extending angle iron 179 to provide additional seals. The doors are braced by providing a box section afforded by a wall extending between the diverging walls.

To open the rear doors of the blast head, each angle iron 25 arranged on opposite sides of each of the bars 26 which support the frame for carrying the plates as shown in Figs. 9 and 16, is inclined inwardly to provide a wedge-shaped end portion 181 which engages the inwardly inclined portions 174 of the doors to move the doors to open position. After the first frame passes through the blast head and the doors to the furnace and the front door of the blast head are closed, and the shutters or louvers in the blower casings are opened, blowers 56 and 57 which rotate continuously create sufficient vacuum in the blast head to automatically close the rear doors 54 and 55.

The glass plates which have been tempered are then removed from the first frame and when the first frame is again moved to a position in proximity to the entrance of the furnace, additional glass plates or sheets are inserted therein for movement into the first heating zone of the furnace. It will therefore be apparent that after the timer is set, the only labor required is to insert the glass plates in the frames 6 before each rack is moved into the first heating zone of the furnace and to remove the tempered glass from the frames after it emerges from the blast. The apparatus is therefore substantially automatic and continuous in operation.

I claim:

1. Apparatus for tempering glass including a furnace having front doors, a frame for supporting glass in the form of a plate or sheet, a timer mechanism, door operating means actuated by said timer mechanism at a predetermined time after it is set for opening the front doors of the furnace, means actuated by the door operating means following the opening of said front doors for moving the frame carrying the glass plate into the furnace, means associated with and movable with said frame moving means for actuating said door operating means to close the front doors following the movement of said frame into the furnace, and means actuated by said door operating means after the frame has been moved into the furnace to reset the timer.

2. Apparatus for tempering glass including an elongated furnace having front doors and being provided with first and second heating zones, first and second frames each for supporting glass in the form of a plate or sheet, a resettable timer mechanism, movable door operating means actuated by said timer mechanism at a predetermined time after each setting thereof for opening the front doors of the furnace, means actuated by the door operating means the first time the front doors are opened for moving the first frame into the first heating zone of the furnace and the second time the front doors are opened for moving the first frame into the second heating zone of the furnace and the second frame into the first heating zone of the furnace, means associated with and movable with the frame moving means for actuating said door operating means to close the front doors of the furnace following each movement of the frames a predetermined distance, and means actuated by said door operating means after each frame has been moved said predetermined distance to reset the timer.

3. Apparatus for tempering glass including a furnace having first and second heating zones and having front and rear doors, a blast head arranged in alignment with the furnace and having front doors, air moving means arranged in the blast head, a casing for the air moving means having an outlet, movable means for closing and opening the outlet of said casing, first, second and third frames each arranged to support glass in the form of a plate or sheet the first and second frames beeing arranged to be positioned respectively in said second and first heating zones in said furnace and the third frame being arranged to be positioned at the front of and in proximity to said furnace, a timer mechanism, operating means actuated by said timer mechanism at a predetermined time after the setting thereof for opening the doors of the furnace and the front doors of said blast head and for actuating said movable means to close the outlet of said casing for the air moving means, means actuated by said operating means following the opening of said doors of the furnace and said front doors of the blast head for moving the first frame carrying a glass plate into the blast head and the second frame carrying a glass plate into the second heating zone in the furnace and the third frame carrying a glass plate into the first heating zone in the furnace, means associated with and movable with the frame moving means for actuating said operating means to close the doors of the furnace and the front doors of the blast head and to actuate said movable means to open said outlet in said casing following the movement of said first frame into the blast head and the movement of said second frame into the second heating zone in the furnace and the movement of said third frame into the first heating zone in the furnace, and means actuated by said door operating means to reset the timer following the closing of said doors of the furnace and said front doors of the blast head.

4. Apparatus for tempering glass including a furnace having front and rear doors, a blast head arranged in alignment with the furnace and having front and rear doors, air moving means arranged in the blast head, a casing for the air moving means having an outlet, movable means for closing and opening the outlet of said casing, first and second frames and an additional frame each arranged to support glass in the form of a plate or sheet, the first frame being arranged to be positioned in said blast head, the second frame being arranged to be positioned in said furnace, and said additional frame being arranged to be positioned at the front of the furnace, carriers for carrying said frames in spaced relation to each other, a timer mechanism, operating means actuated by said timer mechanism at a predetermined time after the setting thereof for opening the doors of the furnace and the front doors of said blast head and closing the outlet of said casing for the air moving means, means actuated by said operating means following the opening of the doors of the furnace and the front doors of the blast head for moving the first frame and the carrier therefor through the rear doors of the blast head, the second frame into the blast head, and said additional frame into the furnace, means actuated by said operating means after each frame has been moved a predetermined distance to reset the timer, and means associated with and movable with said frame moving means for actuating said operating means to close the doors of the furnace and the front doors of the blast head and to actuate said movable means to open said outlet in said casing following the movement of said first frame out of the blast head and the movement of said second frame into the blast head and the movement of said additional frame into the furnace.

5. Apparatus for continually tempering glass in the form of sheets or plates comprising a furnace provided with first and second heating zones and front and rear doors, a blast head having front and rear doors arranged in alignment with the doors of the furnace, a pair of spaced cooling frames arranged in the blast head, air moving means arranged in said blast head above the cooling frames including a casing having an outlet opening provided with louvers, a track in the form of a loop arranged above the furnace and extending through the blast head, a carrier movable on said track having a plurality of similar racks spaced at predetermined distances from each other and each rack comprising a frame carrying glass plates, a timer mechanism, movable operating means actuated by said timer mechanism at a predetermined time after each setting thereof for opening the doors of the furnace and the front doors of the blast head and closing said louvers, means responsive to the opening of the doors of the furnace and the front doors of the blast head and at each time said doors are opened for resetting the timer mechanism and moving the carrier a sufficient distance on said track to move each of said racks in sequence and by steps into the first heating zone of the furnace, the second heating zone of the furnace, between the cooling frames in the blast head, and then through the rear doors, of the blast head, means arranged upon each rack for opening the rear doors of the blast head during advancement of said rack toward the rear doors of the blast head, means associated with and movable with the carrier moving means and operative after each rack has been moved a predetermined distance to actuate said operating means to close the doors of the furnace and the front doors of the blast head and to open the louvers in the outlet opening of said casing of the air moving means, and said track being so arranged that each rack after passing through the blast head and after the tempered glass is removed therefrom is returned in sequence and by steps by the carrier to the front of the furnace where glass plates may be again inserted in the frame of each rack.

6. Apparatus for tempering glass comprising a furnace and a blast head, each having front and rear doors arranged in alignment with each other, a pair of cooling frames arranged in the blast head, air moving means arranged in said blast head having a casing provided with an outlet, movable means arranged in the casing outlet which are movable to open and close said outlet, said air moving means being effective in creating a vacuum in said blast head when the casing outlet is open which vacuum is destroyed when the casing outlet is closed, first and second racks carrying glass plates, timing means for initiating the opening of the doors of the furnace and the front doors of the blast head, a movable carrier for conveying said first rack carrying a glass plate from the furnace between the cooling frames, when the doors of the furnace and the front doors of the blast head are open and the second rack carrying a glass plate from the cooling frames through the rear doors of the blast head, means upon said carrier for opening the rear doors of the blast head during the movement of said carrier, and means for actuating said movable means to close the outlet of said casing when the glass carried by the first rack is being conveyed from the furnace to a position between the cooling frames and the glass carried by the second rack is being conveyed outwardly through the rear doors of the blast head to thereby prevent cold air from being drawn into said blast head through the rear doors.

7. Apparatus for tempering glass including a furnace having front and rear doors arranged in alignment with each other, a blast head having a front door which is arranged in alignment with the front and rear doors of the furnace, air moving means arranged in said blast head having a casing provided with an outlet, movable means arranged in the outlet of said casing which are movable to open and close said outlet, said air moving means being effective in creating a partial vacuum in said blast head when the outlet in said casing is open which vacuum is destroyed when the outlet in said casing is closed, operating means for simultaneously opening the front and rear doors of said furnace and the front door of said blast head and actuating said movable means to close the outlet of said casing, timing means for initiating the operation of said operating means to open said doors and actuate said movable means to close said outlet, a rack carrying a glass plate, a movable carrier for conveying said rack, means for moving said carrier to first convey said rack into said furnace and after a short interval of time from the furnace into said blast head when the doors of said furnace and the front door of said blast head are open, and means for actuating said operating means to simultaneously close the doors of said furnace and the front door of said blast head and actuate said movable means to open the outlet of said casing during the interval of time between the movements of said carrier.

References Cited in the file of this patent

UNITED STATES PATENTS

| | | |
|---|---|---|
| 1,851,484 | Bausman | Mar. 29, 1932 |
| 2,042,610 | Littleton | June 2, 1936 |
| 2,111,370 | Owen | Mar. 15, 1938 |
| 2,166,348 | Ford | July 18, 1939 |
| 2,178,520 | Howard | Oct. 31, 1939 |
| 2,188,401 | Crowley | Jan. 30, 1940 |
| 2,198,622 | Forbes | Apr. 30, 1940 |
| 2,204,532 | Erbguth et al. | June 11, 1940 |
| 2,259,741 | Drake | Oct. 21, 1941 |
| 2,262,545 | Do Huu Chan | Nov. 11, 1941 |
| 2,271,373 | Long | Jan. 27, 1942 |
| 2,318,584 | Bird | May 11, 1943 |
| 2,354,429 | Davis | July 25, 1944 |
| 2,370,381 | Vaughan | Feb. 27, 1945 |
| 2,458,040 | Weller | Jan. 4, 1949 |
| 2,484,925 | Baker et al. | Oct. 18, 1949 |

FOREIGN PATENTS

| | | |
|---|---|---|
| 658,469 | Great Britain | Oct. 10, 1951 |